United States Patent [19]

Tamura

[11] Patent Number: 4,561,024
[45] Date of Patent: Dec. 24, 1985

[54] IMAGE PROCESSING METHOD AND APPARATUS

[75] Inventor: Yasuyuki Tamura, Kawasaki, Japan

[73] Assignee: Canon Kabushiki Kaisha, Tokyo, Japan

[21] Appl. No.: 313,316

[22] Filed: Oct. 20, 1981

[30] Foreign Application Priority Data

Oct. 23, 1980 [JP] Japan .................................. 55-147580

[51] Int. Cl.$^4$ ............................................. H04N 1/04
[52] U.S. Cl. .................................... 358/287; 358/296
[58] Field of Search ............... 358/287, 293, 280, 267, 358/256, 284, 77, 78, 135, 134

[56] References Cited

U.S. PATENT DOCUMENTS

| | | | |
|---|---|---|---|
| 3,272,918 | 9/1966 | Koll et al. | 358/287 |
| 3,541,245 | 11/1970 | Wilby | 358/287 |
| 4,092,632 | 5/1978 | Agulnek | 358/287 |
| 4,163,605 | 8/1979 | Yamada | 358/287 |
| 4,318,134 | 3/1982 | Partridge et al. | 358/287 |
| 4,366,508 | 12/1982 | Crean et al. | 250/208 |

Primary Examiner—Edward L. Coles, Sr.
Attorney, Agent, or Firm—Fitzpatrick, Cella, Harper & Scinto

[57] ABSTRACT

An image processing method and apparatus which can variably magnify image data, comprises a source for generating the image data in the form of a serial pulse signal, a memory for storing the image data, and a processing unit for producing the image data signal from the source at a first rate and reproducing the data at a second rate different from the first rate and storing the reproduced data in the memory.

19 Claims, 5 Drawing Figures

IMAGE PROCESSING METHOD AND APPARATUS

BACKGROUND OF THE INVENTION

1. Field of the Invention

The present invention relates to method and apparatus for transforming an image signal by a variable magnification factor.

2. Description of the Prior Art

In recent years, it has been proposed to read an original image of a text with an image sensor such as a CCD sensor, convert the read image to an electrical signal, digitize the electrical signal, and store in a memory or transmit the digitized image signal. When two images are combined and edited for printing or display, a dimension of an area in a first image in which a second image is to be inserted and a dimension of the second image to be inserted into the area of the first image are to be equal. If the dimension of the area into which the image is to be inserted and the dimension of the image to be inserted are different, either the area or the image to be inserted should be enlarged or reduced to make both dimensions equal and the digital signal of the magnified second image may be transferred to a memory area in which the digital signal of the first image signal is stored in order to combine both digital signals. In reproducing the combined image, the combined digital signal stored in the memory area is transferred to an output device such as a laser beam printer.

Where images of different dimensions are to be combined, it is necessary to change the dimension of the image without transforming a picture cell density.

On the other hand, where a facsimile device is connected to a computer output laser beam printer, the picture cell density must be transformed.

Facsimile devices usually have a picture cell density of 8 pixels/mm or 12 pixels/mm. On the other hand, most computer output laser beam printers have the picture cell density of 9.45 pixels/mm (240 pixels/inch). When an image signal transmitted through the 8 pixels/mm facsimile device is printed by the 9.45 pixels/mm laser beam printer, the image is reduced by a factor of 8/9.45 (=0.85). Thus, in order to produce a normal printout, the picture cell density must be transformed.

One method of transforming the picture cell density is to use a computer with appropriate software. However, this method is disadvantageous in that it takes a long time to magnify the image and transform the picture cell density because each of the picture cells must be processed. It may take several tens of seconds to several minutes even with a high performance computer.

In order to allow continuous magnification factor rather than fixed magnification factors such as factors of two and one-half, very complex software and peripheral hardware are required.

It is very difficult to variably magnify image data including half tone image data and no such proposal has been known.

SUMMARY OF THE INVENTION

It is an object of the present invention to provide an image processing method and apparatus which are free from the above-mentioned defects.

It is another object of the present invention to provide an image processing method and apparatus having a simple configuration which can variably magnify an image signal.

It is another object of the present invention to provide an image processing method and apparatus which can variably magnify image data including half tone image data.

It is another object of the present invention to provide an image processing method and apparatus which can variably magnify image data without modifying a synchronizing signal of an output device such as a printer.

It is an object of the present invention to provide an image processing method and apparatus which can variably magnify image data without changing the size of each picture cell.

It is another object of the present invention to provide an image processing method and apparatus which can continuously variably magnify image data.

It is another object of the present invention to provide an image processing method and apparatus which can precisely and positively process edges of digital picture cells in the variable magnification of image data.

It is another object of the present invention to provide an image processing method and apparatus which can variably magnify digital image data with hardware.

It is another object of the present invention to provide an image processing method and apparatus which allow the reproduction of images of the same dimension with output devices of different picture cell densities.

The above and other objects of the present invention will be apparent from the following description.

DESCRIPTION OF THE PREFERRED EMBODIMENTS

In one preferred embodiment of the present invention, an image digital signal transferred serially in the direction of scan is converted to an analog signal which represents densities of respective picture cells and it is converted to a second digital signal having a rate different from that of the original or first serial digital signal. The analog signal representing the densities of the picture cells is averaged by being integrated in synchronism with the rate of the receiving station. Where the picture cells in the image digital signal merely represent white or black, circuit configurations before and after the integration circuit can be simplified.

The present invention will now be explained in detail with reference to the drawings.

Figure 1:
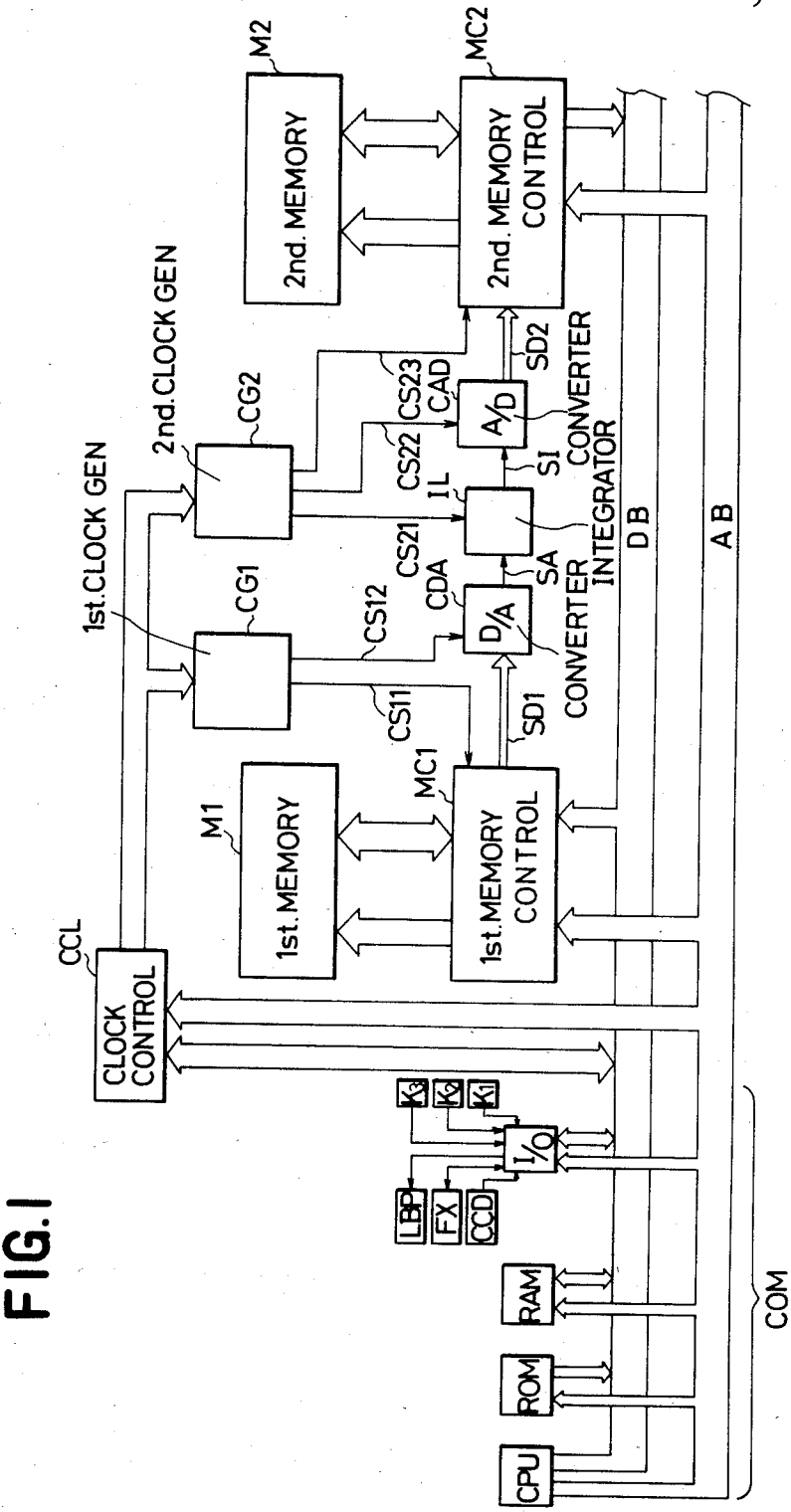
FIG. 1 shows a block diagram of one embodiment of an image processing apparatus in accordance with the present invention.

FIG. 1 shows a block diagram of one embodiment of the present invention. Referring to FIG. 1, a data bus DB and an address bus AB are shared by bus lines of a computer COM which processes an image digital signal. One scan line of signal (e.g. one scan line for document readout by a CCD) of the image digital signal is stored in a first memory M1 through the data bus DB under the control of a first memory control MC1. Alternatively, an image of a text read by the CCD may be stored in a memory RAM and one line of data therein may be transferred to and stored in the memory M1.

Information relating to a factor of magnification is set in a clock control CCL which controls frequencies of clock signals generated by a first clock generator CG1 and a second clock generator CG2 in accordance with the factor of magnification. The image information stored in the first memory M1 is supplied to a digital-to-analog (D/A) converter CDA as a digital signal SD1 (e.g. parallel 2-bit code per picture cell) in synchronism with the clock signal CS11 from the first clock generator CG1, through the first memory control MC1. The D/A converter CDA converts the image digital signal SD1 to an analog signal in synchronism with the clock signal CS12 (FIG. 4) from the first clock generator CG1 and supplies the analog output signal SA to an integrator IL. Where the digital signal SD1 is a binary signal representing black or white, the D/A converter is not necessary and the signal may be supplied to the integrator IL through a simple current amplifier. The integrator IL integrates the signal in synchronism with the clock signal CS21 (FIG. 4) from the second clock generator CG2 and supplies an integrated output signal SI to an analog-to-digital (A/D) converter CAD. The integrated output signal SI is converted to a digital signal SD2 in synchronism with the clock signal CS22 from the second clock generator CG2. The digital signal SD2 is stored in a second memory M2 in synchronism with the clock signal CS23 under the control of the second memory control MC2. As a result, the number of picture cells per line in the memory M1 is changed in accordance with a ratio of the frequencies of the first and second clock generators and the changed number is stored in the memory M2. The frequencies of the clock signals CS11 and CS12 from the first clock generator CG1 are equal but the phases thereof are offset in view of a delay included in the circuit operation. The clock signals CS21, CS22 and CS23 from the second clock generator CG2 are also equal in their frequencies but different in their phases.

Figure 2:
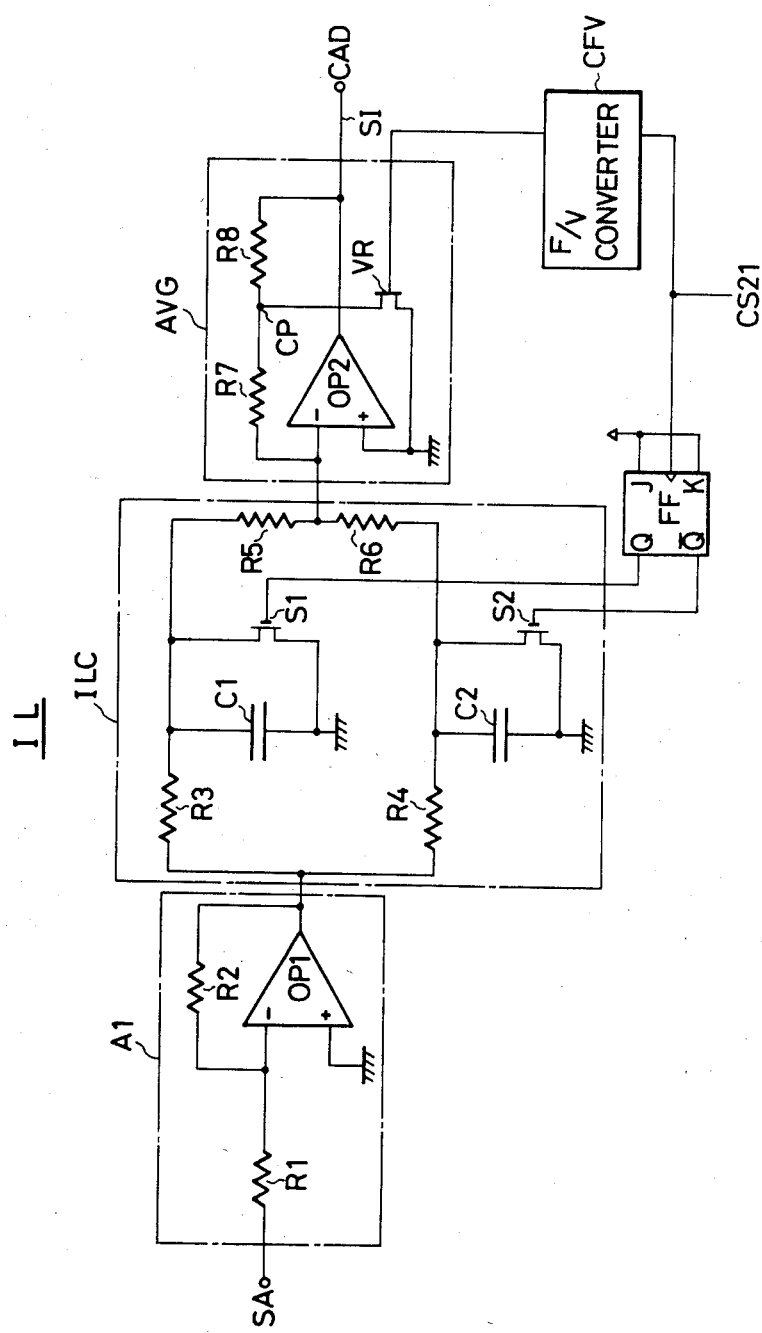
FIGS. 2 and 3 show detailed circuit diagrams of FIG. 1.

FIG. 2 shows a detailed block diagram of one embodiment of the integrator IL shown in FIG. 1. In FIG. 2, an input I5 amplifier circuit A1 comprises a combination of a well known operational amplifier OP1 and resistors R1 and R2. An integration circuit ILC comprises a set of a resistor R3 and a capacitor C1 and a set of a resistor R4 and a capacitor C2 which sets are connected in parallel to a variable gain amplifier AVG through resistors R5 and R6. Connected across the capacitors C1 and C2 are semiconductor switches S1 and S2, respectively, which are turned on and off under the control of output signals of a flip-flop FF.

The variable gain amplifier AVG is a voltage follower comprising an operational amplifier OP2 and resistors R7 and R8, and a semiconductor variable resistance element VR is connected between the junction CP of the resistors R7 and R8 and ground.

The clock signal CS21 from the second clock generator CG2 is supplied to a clock input terminal of the flip-flop FF and also supplied to a frequency-to-voltage (F/V) converter CFV. An output of the F/V converter CFV is supplied to a control terminal of the variable resistance element of the variable gain amplifier AVG.

Figure 4:
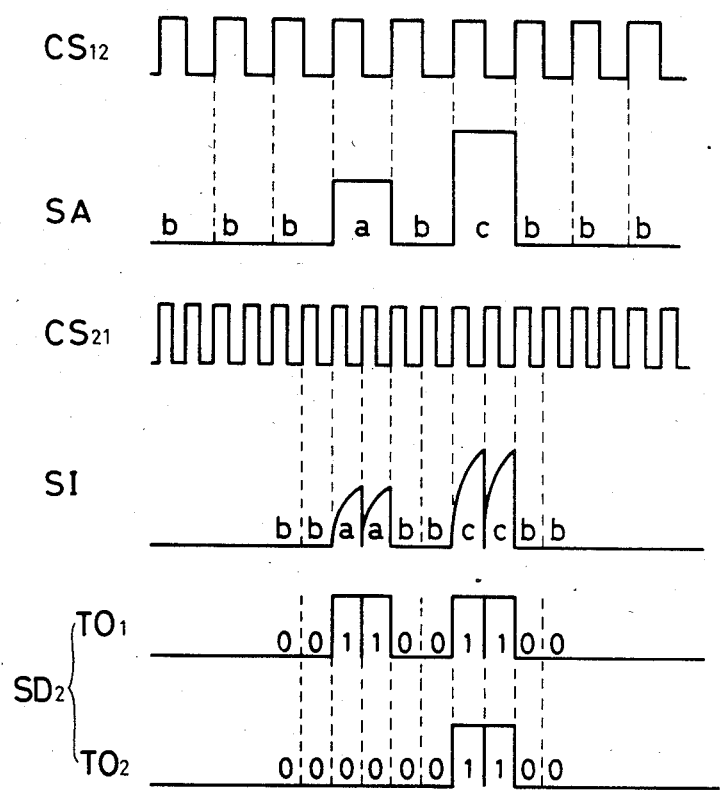
FIG. 4 shows a signal time chart for FIG. 2, and, FIG. 5 shows a control flow chart for FIG. 1.

The operation of the integrator IL thus constructed is now explained with reference to FIG. 4. As described above, the image data signal SA is provided to the integrator IL in synchronism with the clock CS12. Let us assume that the frequency of the clock from the first clock generator CG1 is twice as high as the frequency of the clock from the second clock generator CG2 so that the image is to be enlarged by a factor of two. It is also assumed that a of the image data SA shown in FIG. 4 represents a density level 1 (gray), b represents a density level 0 (white) and c represents a density level 2 (black). The digital data SD1 is thus represented by (1,0), (0,0) and (1,1).

Since the flip-flop FF flips at each clock of the clock signal CS21, the switches S1 and S2 are turned on and off alternately. Thus, the analog signal SA amplified by the input amplifier circuit A1 is integrated by one of the capacitors C1 and C2 having the associated switch S1 or S2 in the off state. After the next clock, it is integrated by the other capacitor. As a result, in the integration circuit ILC, the serial signal is integrated in every clock period without a rest period. Consequently, the integration circuit ILC produces a waveform close to that of the signal SI having a double number of picture cells. This output is amplified and level-compensated by the amplifier AVG to produce the signal SI which maintains the original half tone. The signal SI is then converted to the digital code SD2 (e.g. 2-bit TO1 and TO2) by the converter CAD. The magnified picture cell data SD2 is stored in the one-line memory M2.

The F/V converter CFV changes its output voltage in accordance with the clock frequency of the clock signal CS21. Since the resistance of the variable resistance element VR is varied with the output voltage of the F/V converter CFV, the gain of the variable gain amplifier AVG is controlled by the frequency of the clock signal CS21. In this manner, errors of the ratios of the levels a, b and c of the output of the integration circuit ILC from those of the original data are compensated.

The voltage output integrated by the integration circuit ILC at the controlled gain is then amplified and supplied to the A/D converter CAD. The integrated output signal SI which is the analog signal to be supplied to the A/D converter CAD is normalized to represent a mean value of the input analog signal SA.

Referring again to FIG. 1, the digital signal stored in the second memory M2 includes one scan line of image information stored in the first memory M1. Since it is read out by the clock signal from the first clock generator CG1 and then stored in response to the clock signal from the second clock generator CG2, it is modulated or magnified. The magnified image information can be read out by activating the second memory control MC2 by the image processing computer COM to control the second memory M2. The memory M2 may be read by a constant rate serial pulse train irrespective of whether the image is of equal scale or magnified.

The factor of magnification is determined by a ratio of the clock frequencies CK1 and CK2 of the first and second clock generators CG1 and CG2. Thus, the number of picture cells obtained by the present digital signal converter is equal to the number of input picture cells magnified by CK2/CK1. Accordingly, when the size of image of each picture cell is constant, the size of the image is magnified by the factor of CK2/CK1. Thus, if the frequency CK2 of the second clock generator CG2 is higher than the frequency CK1 of the first clock generator CG1, the image size is enlarged, and if the former is lower than the latter, the image size is reduced.

In order to change the factor of magnification, one of the clock frequencies CK1 and CK2 may be changed.

In this case, it is preferable that the other clock frequency is kept unchanged. It is particularly preferable to change the lower clock frequency. If the frequency CK2 of the second clock generator CG2 is kept unchanged, it is not necessary to normalize the integrated signal in accordance with the clock signal CK2. As a result, the F/V converter CFV and the variable gain amplifier AVG of the integrator IL (see FIG. 2) may be omitted. If the both frequencies CK1 and CK2 can be varied and one of them is set to a maximum frequency and the other is set appropriately, the image can be enlarged or reduced at a high speed.

While the conversion of one scan line of image information has been described so far, the above operation is sequentially repeated for each of the scan lines. In this manner, the input image signal is magnified either longitudinally or laterally. After the magnification in one direction has been completed, the magnification in the other direction is carried out so that the image is magnified both laterally and longitudinally in order to be ready for optimum transmission.

While the first clock generator CG1 and the second clock generator CG2 are separately controlled by the clock control CCL in the illustrated embodiment, a reference signal may be frequency-divided by different frequency division ratios to produce different clock signals. Alternatively, the clock frequencies CK1 and CK2 may be obtained from a reference signal by a phase locked loop (PLL). With this arrangement, the factor of magnification can be precisely and relatively freely set.

Figure 3:
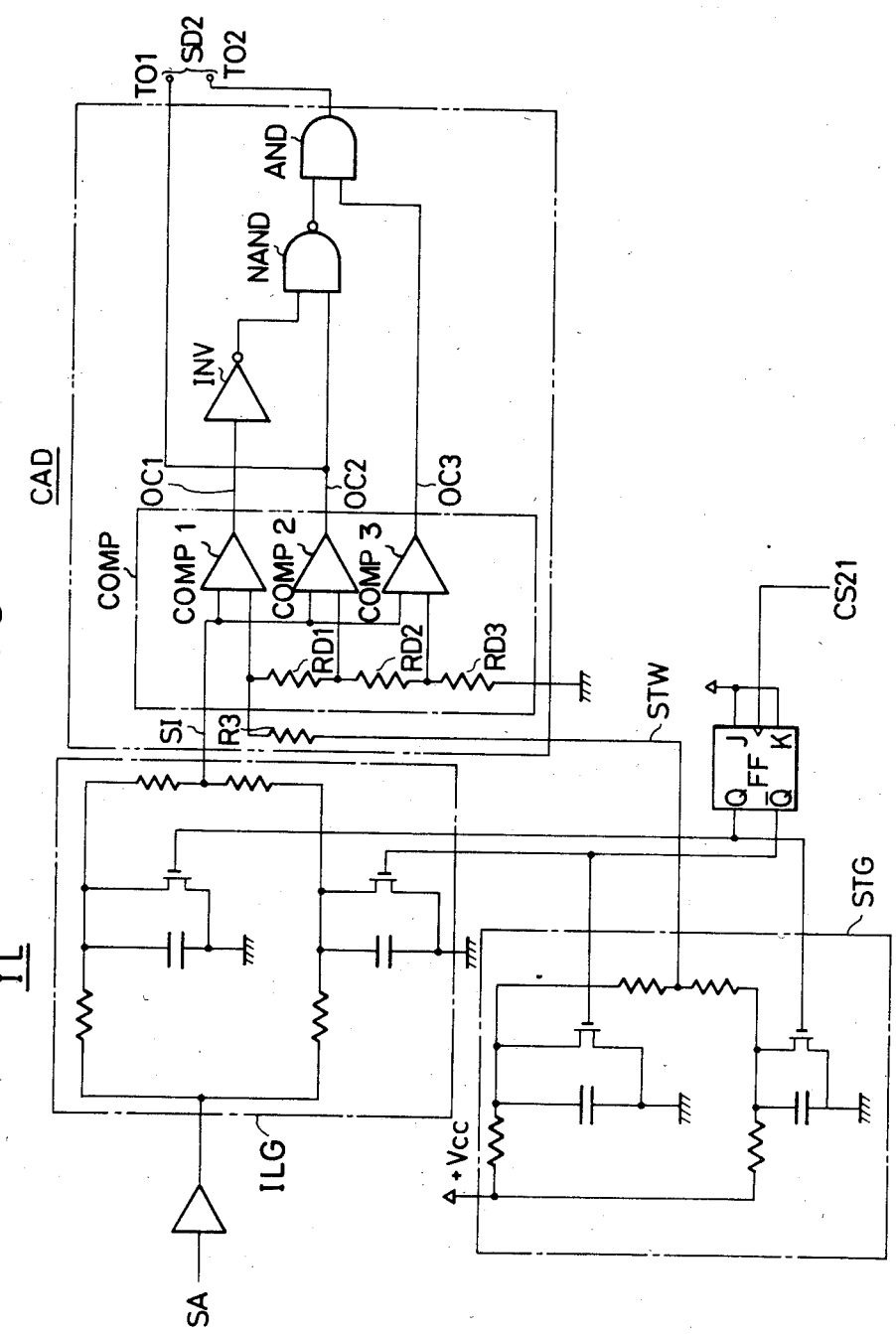

FIG. 3 shows a circuit diagram of one embodiment of a circuit which unites the integrator IL and the A/D converter CAD of FIG. 1. In FIG. 3, a sawtooth wave generator STG having the same circuit configuration as the integration circuit ILG is provided. An A/D converter CAD comprises voltage dividing resistors RD1, RD2 and RD3 for dividing a sawtooth wave signal STW through an input resistor R3, a comparator COMP including comparators COMP1, COMP2 and COMP3 and a logic circuit including a inverter INV, NAND-gate NAND and AND-gate AND.

In response to output signals (Q and $\overline{Q}$) of a flip-flop FF, an integrated output signal SI of an analog signal SA and the sawtooth wave signal STW are generated synchronously. The integrated output signal SI and the sawtooth wave signal STW are compared by the comparator COMP. It is assumed that when the voltage of the integrated output signal SI is larger than the divided voltage of the sawtooth wave signal STW as compared by the comparators COMP1, COMP2 and COMP3, the outputs OC1, OC2 and OC3 thereof assume "1" levels. The relation between the outputs of the comparator COMP and the outputs TO1 and TO2 of the A/D converter CAD is shown below.

| OC1 | OC2 | OC3 | TO1 | TO2 |
| --- | --- | --- | --- | --- |
| 1 | 1 | 1 | 1 | 1 |
| 0 | 1 | 1 | 1 | 0 |
| 0 | 0 | 1 | 0 | 1 |
| 0 | 0 | 0 | 0 | 0 |

In this manner, the analog signal SA is converted to the digital signal SD2 (TO1, TO2). The mean value of the image signal is A/D-converted independently of the second clock frequency CK2.

As described above, since the image can be transformed by changing the number of picture cells without changing the size of the picture cells in the memory M1, or it can be magnified by changing the number of picture cells without changing the size of the picture cells, the number of input/output devices is not limited and the edition of the image can be readily carried out.

The integration circuit ILC receives the image data transmitted at a first rate, at a second rate and retransmits it at the second rate.

The magnification of the image data can be attained by directly connecting SD1 and SD2 without using CDA, IL and CAD. It is achieved by providing one line of digital image data from the memory M1 at the pulse CS11 of the clock generator CG1, receiving it at the pulse CS23 of the clock generator CG2 and storing it in the memory M2.

When a half tone image is included, however, an error may occur and noise may be produced in the image if the data SD1 is read into the memory MC2 while the data SD1 is changing at a boundary of the picture cells.

In the illustrated embodiment, on the other hand, if the densities 0 to 7 are included, the density 4 appears at the boundary of the densities 3 and 5 and no error peak density 7 appears.

The CDA, IL and CAD may be constructed in digital processing circuits to allow precise and accurate edge processing.

The image data signal from the text reader such as a CCD may be directly supplied to the integrator IL rather than storing it in the memory RAM or the memory M1.

Figure 5:
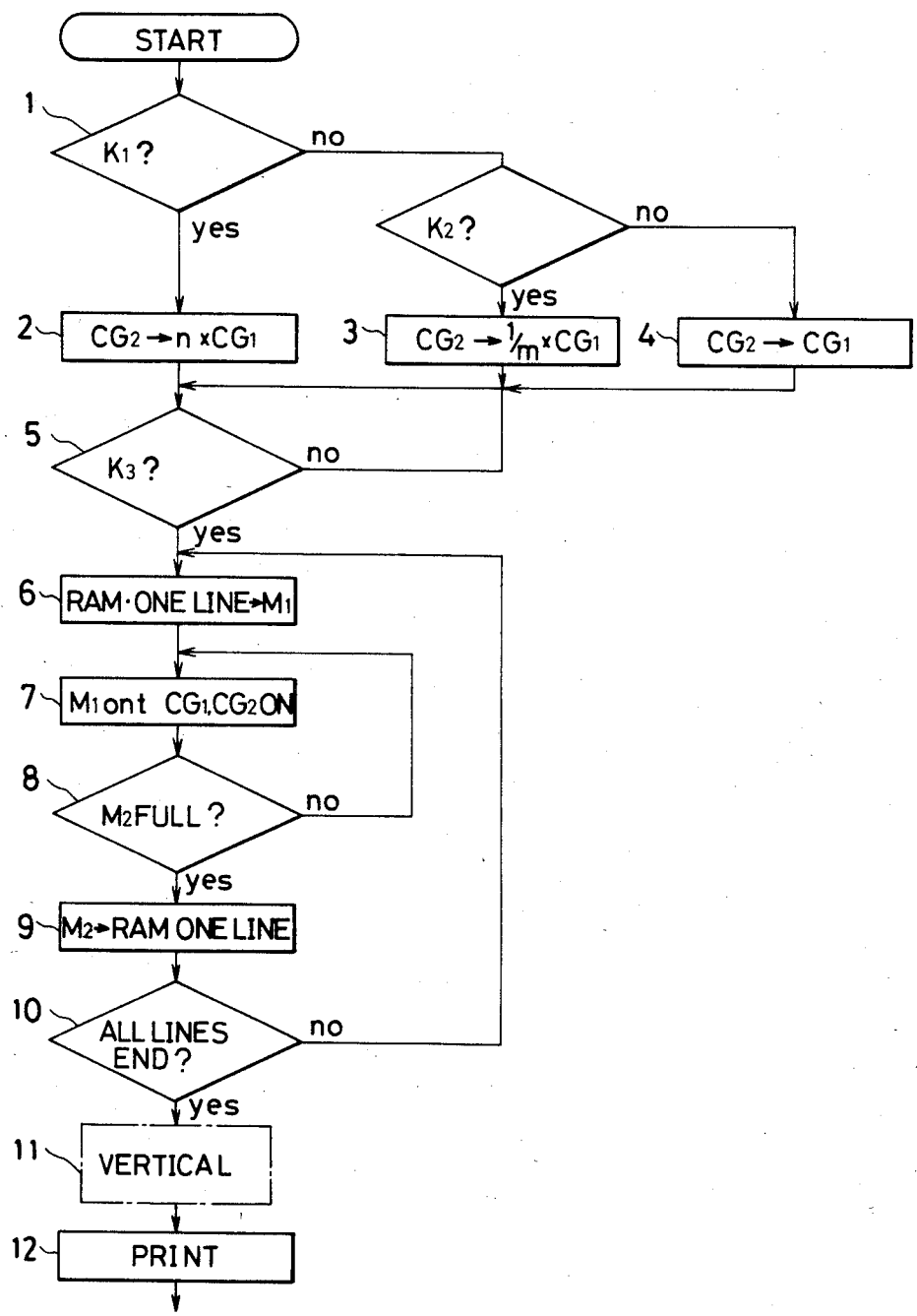

FIG. 5 shows a flow chart for the operation of the computer of FIG. 1. The memory ROM stores the program of the process procedures for the image data, the memory RAM stores the data required in executing the program, the key input data and the readout data by the CCD or the image data transmitted by the facsimile, and the input/output ports I/O in-connect the factor-of-n key K1, the factor-of-1/m key K2, the print key K3 and the CCD and out-connect the well-known laser beam printer LBP and input/output-connect the well-known facsimile device FX (FIG. 1). The central microprocessor CPU processes the RAM, I/O and the image data in accordance with the program stored in the ROM.

It is assumed that the RAM stores one page of text data read by the CCD. When the magnification key K1 is depressed, the CPU detects it (step 1) and causes the clock controller CCL to change the frequency of the clock generator CG2 to be n times as high as that of the clock generator CG1 (step 2), or 1/m times as high as that of the clock generator CG1 when the key K2 is depressed (step 3), or to be equal to that of the clock generator CG1 when no key is depressed (step 4). When the print key K3 is then depressed (step 5), one line of image data in the RAM is transferred to and stored in the memory M1 (step 6). The memory controller MC1 is then activated to activate the clock generators CG1 and CG2 to carry out the magnification of the image data and the magnified image data is stored in the memory M2 (step 7). When the CPU detects the end of the storage of one line of data in the memory M2 (step 8), the data in the memory M2 is stored in the first line of the RAM (step 9). When the magnification process for all of the lines has been completed (step 10), a similar process is repeated to longitudinally magnify the laterally magnified image data. When the process is completed, the laser beam printer LBP is controlled in accordance with the magnified data in the RAM (step 12) to produce the desired magnified copy. In the longitudinal magnification process, it is possible to set different ratios for the frequencies of the clock generators CG1 and CG2 than those in the lateral magnification process by operating the keys K1 and K2.

When a copy with single direction magnification is desired, the steps 10 and 11 are omitted and the laser beam printer LBP is controlled by the data in the memory M2.

In accordance with the present invention, the image data can be variably magnified to transform the image density and the half tone image can also be magnified. The edge process of the image can be precisely and accurately carried out and the connection of the devices of different picture cell densities such as the facsimile device and the laser beam printer can be effectively attained.

What I claim is:

1. An image processing method comprising:
   a first step of serially producing an analog image data signal in accordance with a first clock signal;
   a second step of converting said analog image data signal into a digital signal;
   a third step of transmitting said digital signal to storage means, in accordance with a second clock signal different from said first clock signal, the frequency of said second clock signal being set in a predetermined proportional relation to the frequency of said first clock signal in accordance with a magnification factor; and
   a fourth step of storing said digital signal in said storage means.

2. An image processing method according to claim 1 wherein said first step produces said analog image data signal in synchronism with said first clock signal of a first frequency, and said third step transmits and said fourth step stores said digital signal in synchronism with said second clock signal of a second frequency different from said first frequency.

3. An image processing method according to claim 2 wherein a ratio of said first frequency and said second frequency is variable.

4. An image processing method according to claim 1 wherein said first step converts a digital image data signal into said analog image data signal and thereby produces said analog signal, and said second, third and fourth steps integrate said analog image data signal in accordance with said second clock signal, convert said integrated signal to said digital signal and store said digital signal in said storage means in accordance with said second clock signal.

5. An image processing method according to claim 1 wherein said storage means receives said digital signal in accordance with a second clock signal, a frequency of said second clock signal being higher than a frequency of said first clock signal, and stores the increased number of the image data.

6. An image processing method according to claim 1 wherein said storage means stores a plurality of said digital signals corresponding to one said analog image data signal.

7. An image processing method according to claim 1 wherein a ratio of the frequency of said first clock signal to the frequency of said second clock signal is predetermined to a given magnification factor.

8. An image processing apparatus comprising:

a source for generating image data in the form of a signal;
   storage means for storing an image data signal generated by said source; and
   processing means for controlling said source to produce said image data signal in accordance with a first clock signal; for receiving said image data signal in accordance with a second clock signal different from said first clock signal for storage in said storage means; and for causing said received image data signal to be stored in said storage means; said processing means further setting a frequency of said second clock signal in a predetermined proportional relation to a frequency of said first clock signal in accordance with a magnification factor.

9. An image processing apparatus according to claim 8 wherein said processing means includes a first clock signal generator for generating said first clock signal of a first frequency for causing said source to produce said image data signal and a second clock signal generator for generating said second clock signal of a second frequency for receiving and storing said image data signal.

10. An image processing apparatus according to claim 9 wherein a ratio of said first frequency and said second frequency is variable.

11. An image processing apparatus according to claim 8 wherein said storage means receives said image data signal in accordance with said second clock, a frequency of said second clock signal being set higher than a frequency of said first clock signal, and stores the increased number of said image data signal.

12. An image processing apparatus according to claim 8 wherein said storage means is provided to store a plurality of said received image data signals corresponding to one of said image data signals generated by said source.

13. An image processing apparatus according to claim 8, wherein a ratio of the frequency of said first clock signal to the frequency of said second clock signal is predetermined to a given magnification factor.

14. An image processing apparatus comprising:
   means for serially producing picture cell data in lines in accordance with a first clock signal; and
   means for processing the picture cell data produced by said producing means and for changing the number of picture cell data in one line in order to form an image that is one of enlarged and reduced;
   said processing and changing means including storage means for receiving said serial picture cell data in accordance with a second clock signal different from said first clock signal and for storing said received data;
   said processing and changing means setting a frequency of said second clock signal in a predetermined proportional relation to a frequency of said first clock signal in accordance with a magnification factor.

15. An image processing apparatus according to claim 14, wherein said storage means receives said picture cell data in accordance with said second clock signal, a frequency of said second clock signal being set higher than a frequency of said first clock signal, and stores the increased number of picture cell data.

16. An image processing apparatus according to claim 14 wherein said storage means is provied to store a plurality of said received data corresponding to one said picture cell data from said producing means.

17. An image processing apparatus comprising:
    producing means for producing analog picture cell data, representative of half tones, in accordance with a clock pulse having a first frequency;
    converting means for converting analog picture cell data representative of half tones produced by said producing means into digital picture cell data representative of half tones;
    storage means for receiving and storing the digital picture cell data, representative of half tones, in accordance with a clock pulse having a second frequency different from said first frequency; and
    control means for setting said second frequency in a predetermined proportional relation to said first frequency in accordance with a magnification factor.

18. An image processing apparatus according to claim 17 wherein said storage means receives said digital picture cell data in accordance with a clock pulse at said second frequency higher than said first frequency, and stores the increased number of the digital picture cell data.

19. An image processing apparatus according to claim 17 wherein said storage means stores a plurality of said digital picture cell data corresponding to one said analog picture cell data.

* * * * *

UNITED STATES PATENT AND TRADEMARK OFFICE
CERTIFICATE OF CORRECTION

PATENT NO. : 4,561,024
DATED : December 24, 1985
INVENTOR(S) : YASUYUKI TAMURA

It is certified that error appears in the above-identified patent and that said Letters Patent is hereby corrected as shown below:

Column 1, line 7, change "to method" to --to a method--; and line 60, change "half tone" to --halftone--.

Column 2, line 5, change "half tone" to --halftone--.

Column 3, line 43, change "input I5 amplifier" to --input amplifier--; and line 44, change "well known" to --well-known--.

Column 5, line 9, change "If the both" to --If both--;

lines 27-28, change "phase locked" to --phase-locked--; and line 63, change "TO2)." to --TO2).--.

Column 7, line 13, change "half tone" to --halftone--.

Column 6, line 15, change "half tone" to --halftone--.

UNITED STATES PATENT AND TRADEMARK OFFICE
CERTIFICATE OF CORRECTION

PATENT NO. : 4,561,024
DATED : December 24, 1985
INVENTOR(S) : YASUYUKI TAMURA

It is certified that error appears in the above-identified patent and that said Letters Patent is hereby corrected as shown below:

Column 8, line 30, change "said second clock, a" to --said second clock signal, a--; and
      line 68, change "provied" to --provided--.

Signed and Sealed this

Twenty-sixth Day of August 1986

[SEAL]

Attest:

DONALD J. QUIGG

Attesting Officer      Commissioner of Patents and Trademarks